(No Model.)
L. KONRAD.
SAFETY ATTACHMENT FOR BICYCLES.
No. 577,261. Patented Feb. 16, 1897.
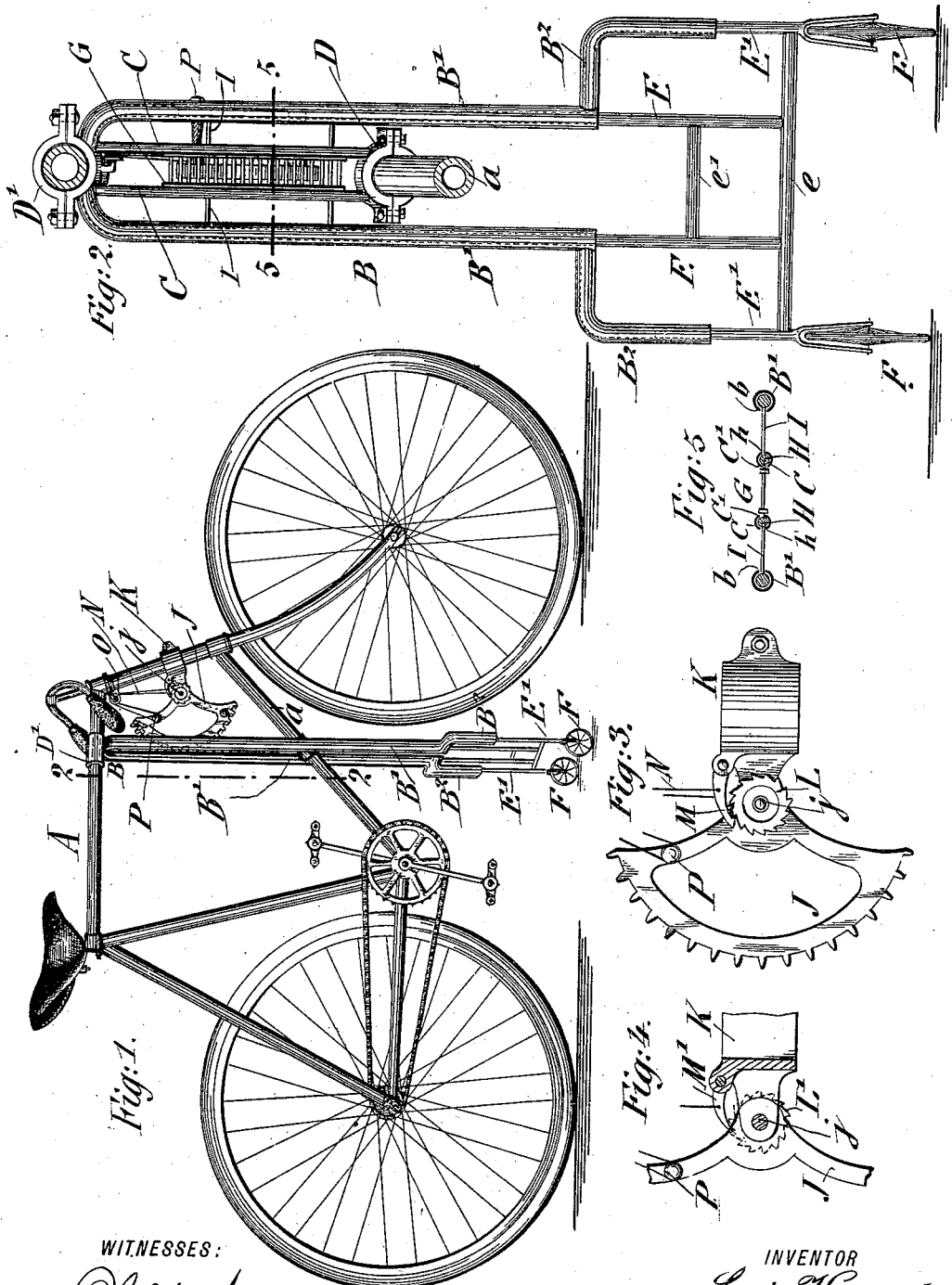
WITNESSES:
INVENTOR
Louis Konrad
BY
ATTORNEYS.

UNITED STATES PATENT OFFICE.

LOUIS KONRAD, OF BROOKLYN, NEW YORK, ASSIGNOR OF THREE-FOURTHS TO CHARLES BOEHRINGER AND GUSTAV P. FROMM, OF SAME PLACE, AND HANS KAUER, OF NEW YORK, N. Y.

SAFETY ATTACHMENT FOR BICYCLES.

SPECIFICATION forming part of Letters Patent No. 577,261, dated February 16, 1897.

Application filed July 31, 1896. Serial No. 601,162. (No model.)

*To all whom it may concern:*

Be it known that I, LOUIS KONRAD, a citizen of the United States, residing in Brooklyn, county of Kings, and State of New York, have invented certain new and useful Improvements in Safety Attachments for Bicycles, of which the following is a specification.

This invention relates to an improved safety attachment for bicycles, the object of the same being to enable beginners to ride bicycles with less danger of falling off than heretofore by providing a convenient means by which they can steady themselves and continue along the road either with or without the use of the safety attachment, said safety attachment being furthermore adapted for the use of elderly persons and others desirous of riding a bicycle with a minimum amount of danger from injury.

My invention consists of certain features to be hereinafter fully described, and then pointed out in the claim.

In the accompanying drawings, Figure 1 represents a side elevation of a bicycle provided with my improved safety attachment. Fig. 2 is an enlarged vertical transverse section through the frame of the bicycle on line 2 2, Fig. 1, showing the safety attachment in elevation. Fig. 3 is an enlarged detail side view of a portion of the safety attachment, showing the toothed segment and pawl-and-ratchet mechanism for raising and lowering the attachment. Fig. 4 is a sectional view of the same parts, showing one of the ratchet-wheels removed; and Fig. 5 is a horizontal section on line 5 5, Fig. 2.

Similar letters of reference indicate corresponding parts.

Referring to the drawings, A indicates the frame of a bicycle of any approved construction, and B the upper fork-shaped guide portion of my improved safety attachment. The upper fork-shaped portion B is made of tubular parallel legs B' B', which at their lower ends are provided with outwardly and downwardly projecting angular extensions $B^2$ $B^2$. Between the parallel tubular legs B' B' are arranged a pair of parallel guide-tubes C C, which at their upper ends are preferably brazed to or otherwise suitably connected with the top of the fork-shaped frame B and are at their lower ends connected to the lower tube $a$ of the frame by means of a pair of clips D, whereby in connection with the pair of clips D', arranged at the upper part of the fork, the same is rigidly and firmly connected with the main frame of the bicycle. By means of the screw-bolts which connect the clips D and D' the attachment is adapted to be quickly applied to and taken away from the frame of the bicycle. The tubular legs B' B' of the main fork B and the tubular angular extensions $B^2$ $B^2$ afford guides for a vertical sliding frame consisting of a pair of elongated parallel rods E E, which are guided in the legs B' B', a pair of outer shorter rods or uprights E' E', which are guided in the depending portions of the angular extensions $B^2$ $B^2$, and of a short cross-bar $e'$, connecting the intermediate elongated rods E E, and a longer lower and main cross-rod $e$, connecting the four rods E', E, E, and E'. The lower ends of the rods E E' of this sliding frame are forked and are provided with bearings for the small auxiliary wheels or rollers F F, which are arranged equidistantly from the longitudinal central plane of the bicycle at each side of the same, which wheels may, if desired, be provided with rubber or other tires, so as to form a yielding contact with the ground.

The sliding frame, which carries the auxiliary wheels F, may be raised or lowered at will by means of a suitable mechanism preferably constructed as now to be described. This raising and lowering mechanism consists of a rack-bar G in the form of a ladder with side bars and cross-pieces, which is attached through adjacent slots C' C' in the intermediate parallel tubes C C with slide-rods H H, which are guided in said tubes C C. (See Fig. 5.) These sliding rods H H are connected by means of connecting-rods I I with the upper ends of the elongated slide-rods E E of the sliding frame, which carries the auxiliary wheels, said connecting-rods I passing through longitudinal slots H in the outer sides of the tubes C' C' and through similar longitudinal slots $b$ in the adjacent sides of the legs B' B' of the forked guide-frame B.

It will be seen that when the device meshes with the cross-bars or rounds of the rack G and tending to raise or lower the same it will, through the medium of the described connections, raise and lower the sliding frame of the auxiliary wheels. To this end a toothed segment J is pivoted at $j$ to a bracket, clip, or other support K, which is secured to the post of the front fork of the bicycle directly under the handle-bar of the same, the teeth of said segment meshing constantly with the rack G.

Affixed to the toothed segment and around its pivot $j$ is a pair of ratchet-wheels L L', arranged, respectively, at opposite sides of the segment with their teeth extending in opposite directions, as shown clearly in Figs. 3 and 4, the ratchet-wheel L being shown as omitted in Fig. 4, so as to more clearly disclose the ratchet-wheel L'. Through the medium of the pawls M M', engaging, respectively, the ratchet-wheels L and L', the sliding frame, and of course the toothed segment which actuates the same, can be locked either against upward or downward movement. In order to have this locking under perfect control of the rider, so that the sliding frame of the safety attachment may be locked either in its lowermost or its uppermost position, there is attached to the pawls M M' a cord N, of wire or any other suitable material, which passes over a pulley O, fixed to a suitable support arranged above the support K on the post of the front fork of the bicycle. This cord, for the purpose of actuating either of the pawls M M' at will, passes to a common point, which in the present instance is a handle or knob P, projecting from the toothed segment J. This handle or knob P is loosely journaled in the toothed segment J, so that it may be rotated, whereby one end or the other of the cord may be wound thereupon, depending on the direction of rotation of the same, so that thereby either the pawl M or M' is raised or lowered. In the drawings the sliding frame carrying auxiliary wheels is shown in its lowermost position. To elevate the same, it is necessary to raise the pawl M' from engagement with its ratchet-wheel L', this being accomplished by turning the handle P in the proper direction, whereupon the toothed segment is raised, thus also raising the sliding frame. On the other hand, whenever it is desired to lower the sliding frame it is only necessary to disengage the pawl M from its ratchet-wheel L by turning the handle P in the opposite direction and lowering the toothed segment.

The described pawl-and-ratchet mechanism affords a lock to the sliding frame when it is in its lowermost or uppermost position, and especially when the frame is in its lowered position said mechanism, in connection with the other parts, forms a firm and rigid support for the bicycle, which is of great assistance to beginners as well as to others who desire to avoid danger of accidents, such as falling from the bicycle.

Having thus described my invention, I claim as new and desire to secure by Letters Patent—

The combination, with the frame of a bicycle, of a tubular main fork provided with means for attaching the same to the frame of the bicycle, a sliding frame provided with auxiliary wheels and having elongated guide-rods guided in the tubular fork, a rack-bar arranged between and connected with the guide-rods, slotted guide-tubes attached to the main fork between the sides of the fork and to the frame of the bicycle, said guide-tubes guiding between them the said rack-bar, a toothed segment pivotally supported on the post of the front fork of the bicycle, and a pawl-and-ratchet mechanism for operating and locking said toothed segment and sliding frame in adjusted position, substantially as set forth.

In testimony that I claim the foregoing as my invention I have signed my name in presence of two subscribing witnesses.

LOUIS KONRAD.

Witnesses:
C. E. GAST,
GEO. W. JAEKEL.